UNITED STATES PATENT OFFICE.

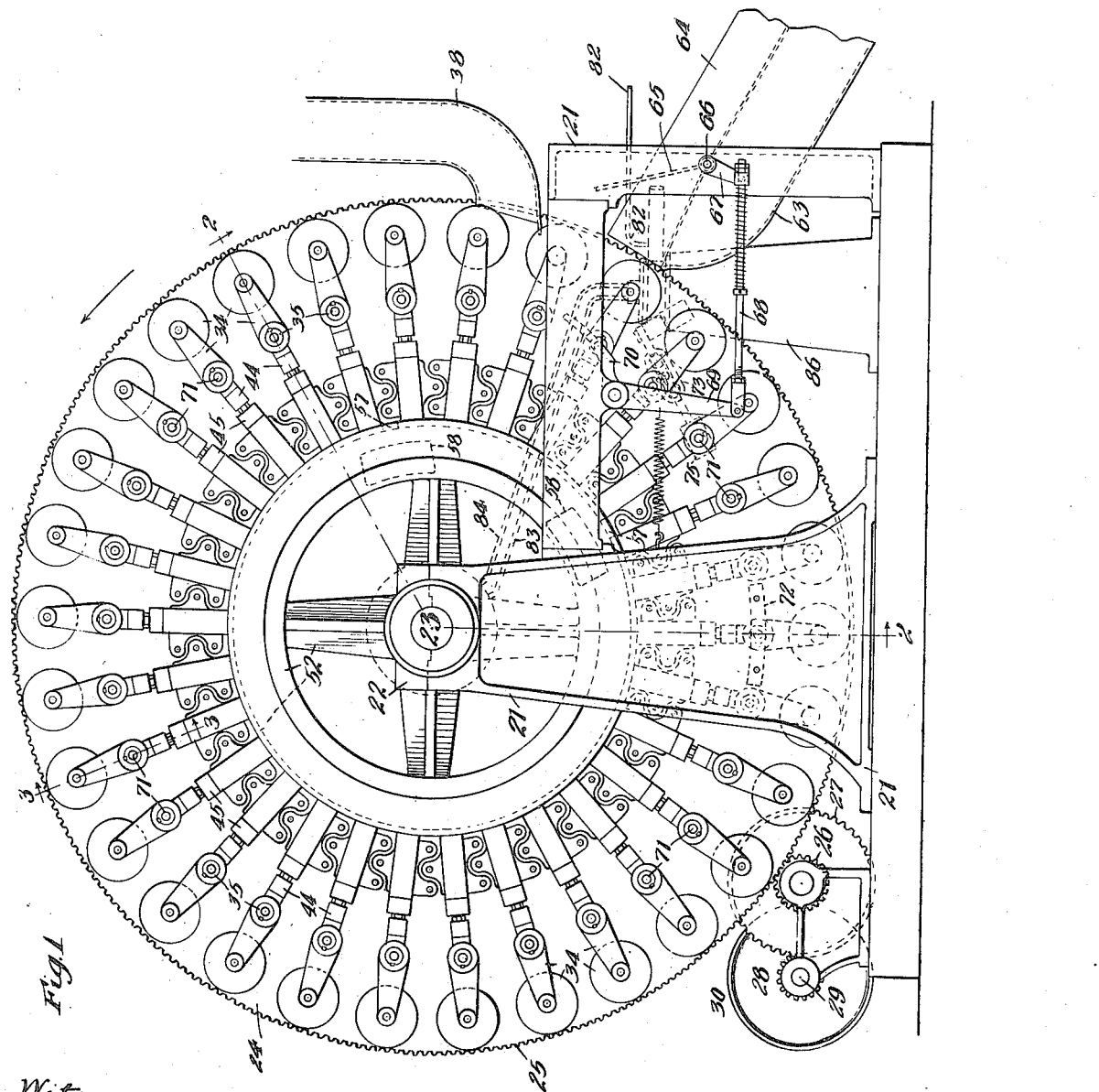

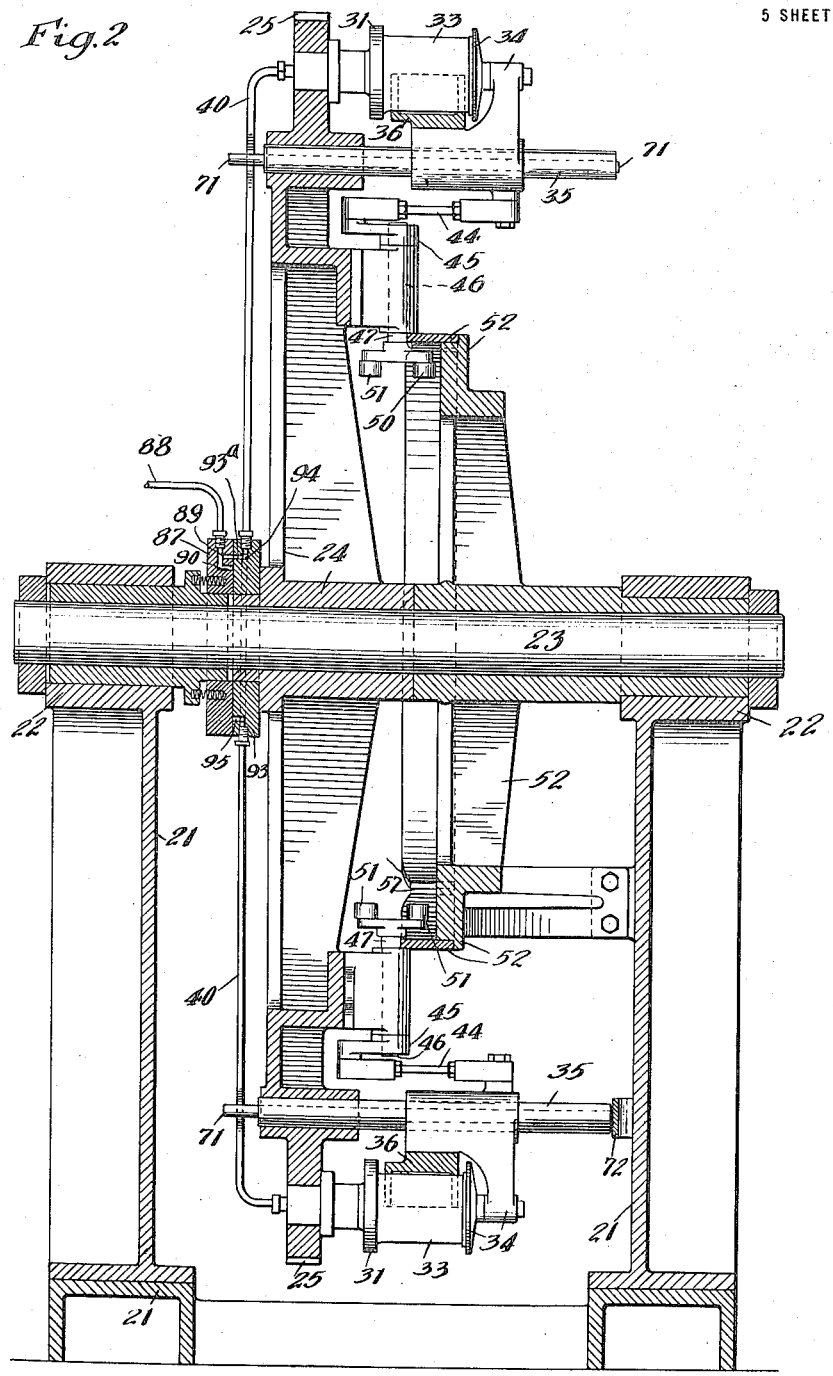

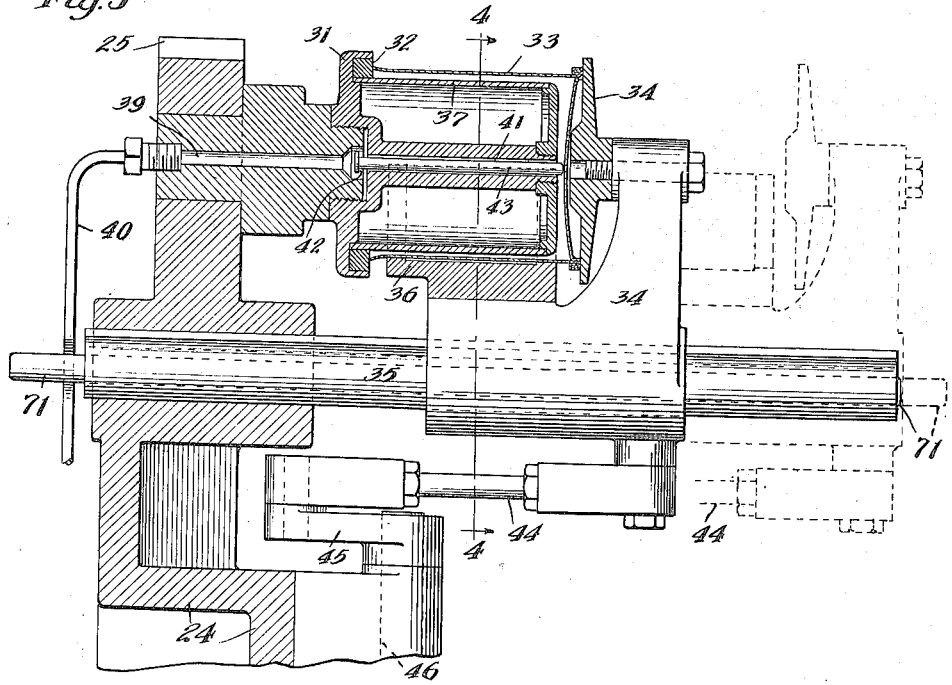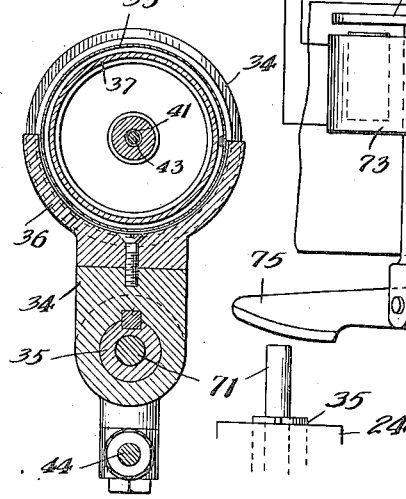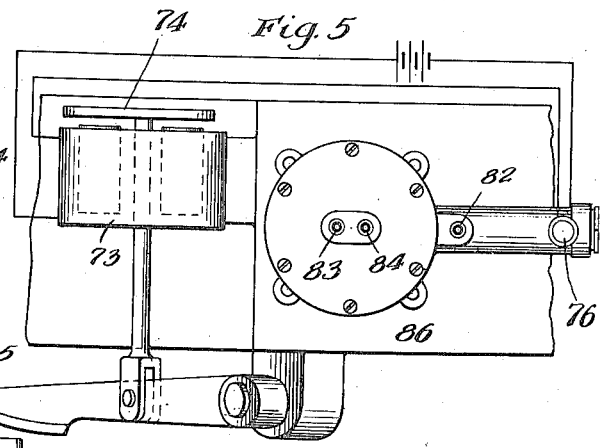

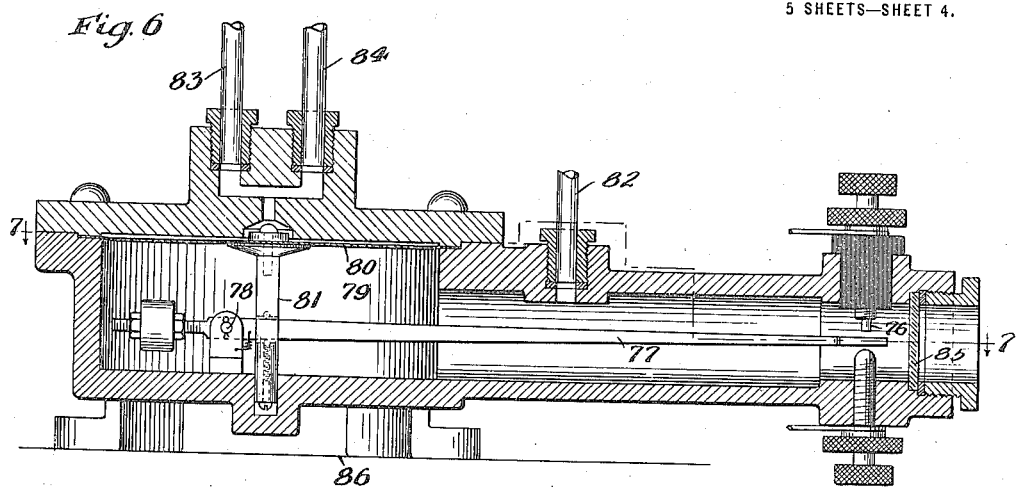
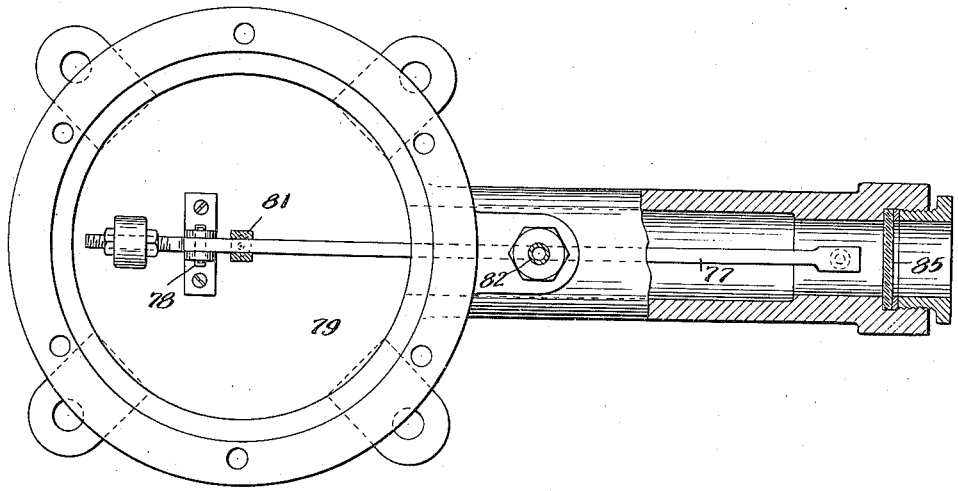

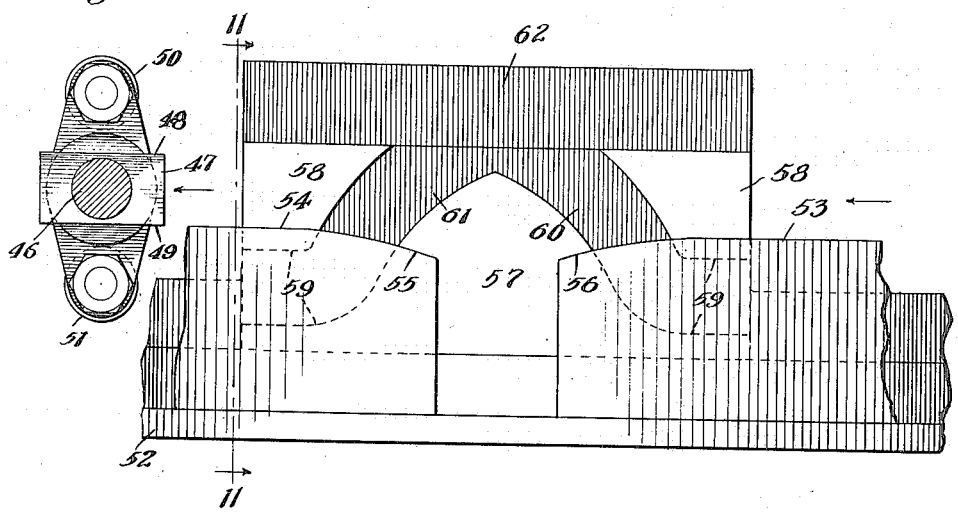
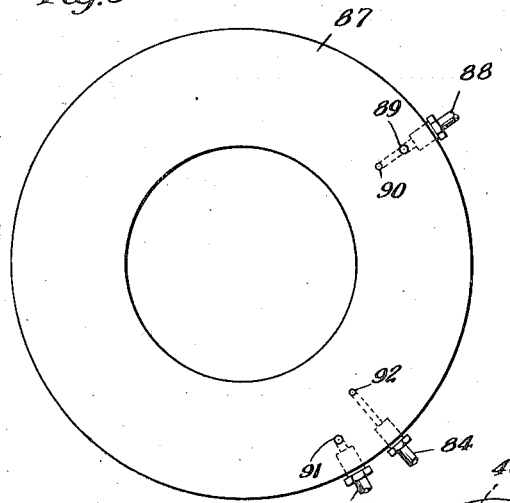
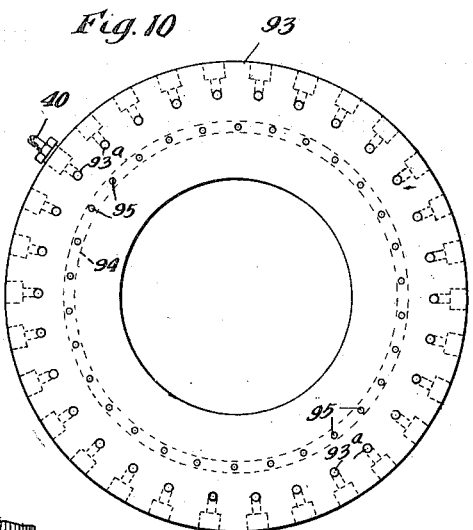
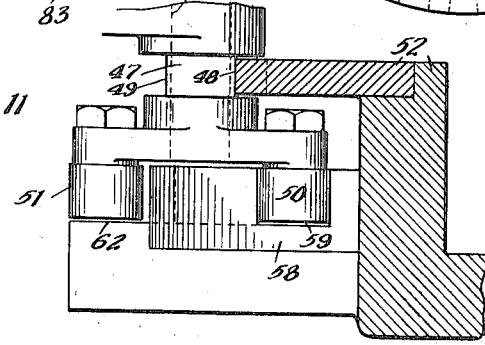

EDWIN V. SWANGREN AND MAGNUS E. WIDELL, OF MAYWOOD, ILLINOIS, ASSIGNORS TO AMERICAN CAN COMPANY, OF NEW YORK, N. Y., A CORPORATION OF NEW JERSEY.

AIR CAN-TESTING MACHINE.

1,152,449.   Specification of Letters Patent.   Patented Sept. 7, 1915.

Application filed May 29, 1911. Serial No. 629,972.

*To all whom it may concern:*

Be it known that we, EDWIN V. SWANGREN and MAGNUS E. WIDELL, citizens of the United States, residing in Maywood, in the county of Cook and State of Illinois, have invented a new and useful Improvement in Air Can-Testing Machines, of which the following is a specification.

This invention relates to an improvement in apparatus for testing cans by filling them with air under pressure and noting the diminution of the pressure due to the escape of the air in the case of leaks; and the invention consists in the novel devices and parts and combinations thereof described and claimed herein and illustrated in the accompanying drawings which form a part of this specification.

In the said drawings Figure 1 is a side elevation of the improved can tester; Fig. 2 a central vertical section of the same upon a somewhat larger scale taken on line 2—2 of Fig. 1; Fig. 3,—upon a still larger scale,—a sectional view of a can to be tested held in the can clamping devices, said section being taken on the line 3—3 of Fig. 1; Fig. 4 a section on the line 4—4 of Fig. 3; Fig. 5 a plan view of the air operated switch, electromagnet and trip device for ejecting the leaky cans; Fig. 6 a vertical central section upon a still larger scale of the air operated electric switch; Fig. 7 a section of the same on the line 7—7 of Fig. 6; Fig. 8 a plan view of the lock cam movement for operating the can holding clamp; Fig. 9 a face view of the stationary air valve disk; Fig. 10 a face view of the counterpart revolving air valve disk; Fig. 11 a section on line 11—11 of Fig. 8.

Described in a general way the improved compressed air can tester consists of a continuously revolving great wheel carrying a number of the cans to be tested, operating to receive and clamp the can; to partly fill the interior of the can with a displacing body; to seal it air tight; to admit to the interior of each can in turn in the diminished space a charge of compressed air from a tank; to cut off the can from further supply by the tank, to give time for the contained compressed air to leak out if the can be defective and thus test its soundness; and to measure afterward, the pressure in each can by a diaphragm balance that ignores the sound cans and in case of a leaky can actuates a switch controlling an electric magnet operating to set a trip that sorts the leaky can from the sound ones. The object of partly filling the interior of the can with a displacing bulk is to render the remaining diminished body of air more sensitive in the indication of leaks in the can while sealed and cut off from the tank.

The compressed air,—it may be added in explanation,—is of course elastic, and hence a leak from such a contained medium will be more manifest by a change in pressure in the containing chamber if the containing chamber be relatively small, for the reason that the quantity leaking out from a given sized chamber in a given time from a small chamber must bear a greater ratio to the entire contents of such small chamber than the same quantity leaking out in the same time would bear to the entire contents of a larger chamber. For obviously the one smaller chamber might contain for example a gallon and the other larger chamber for example ten half gallons, in which case a leak of a gallon would equal one-half the volume of the smaller chamber but would only equal one-twentieth part of the larger chamber.

In the said drawings 21 is the framework of the improved testing machine upon which, in bearings 22, is the shaft, 23, carrying the great wheel, 24, the extreme periphery of which, 25, is cut with gear teeth that mesh with a pinion, 26, through which power is transmitted by the gearing 27, 28, from the power shaft, 29, and pulley 30. This great wheel is made to revolve in the direction of the arrow on Fig. 1 and does not stop while the machine is in operation.

Near the periphery of the great wheel, 24, are mounted the can holding and clamping mechanisms. In the instance illustrated in the drawings the great wheel carries thirty of these mechanisms, which receive, operate upon, and discharge thirty cans successively at each revolution of the great wheel. Each holding and clamping mechanism consists of a base-block 31, provided with an annular cushion, 32, of a size suitable to receive and seal the open end of the can 33. Opposing the base, 31, is a movable head, 34, mounted to slide on the bar, 35, which is extended from the great wheel parallel to its axis. The sliding head, 34, carries a cradle, 36, into which the can, 33, is placed or fed. On the base, 31, is mounted the displacement mass or bulk, 37, which in operation enters the interior of the can, and nearly fills the same, as indicated in Fig. 3. When the holder is passing the feed chute 38,—see Fig. 1,—the movable head, 34, and its can cradle 36 occupies the position indicated in dotted lines at Fig. 3; but on continued rotation of the great wheel the head 34 with the can in its cradle is moved toward the base 31, telescoping the can over the displacement mass and forcing its edge against the sealing cushion 32 thus sealing the interior of the can containing the displacement mass and the small amount of air around the same from the atmosphere. The base, 31, is pierced with the air-tube, 39, connected to the pipe, 40, and to a central tube 41, which latter passes entirely through the displacing mass and delivers the compressed air to the interior of the can in the space between said displacing mass and the bottom of the can. A valve, 42, by the pressure of the air against it serves to keep the tube 41 closed when the air is on and no can is present. Attached to the valve 42 is the valve stem 43, projecting through the displacing mass so that when a can is in position and sealed in the holder this stem will strike the can bottom and hold the valve open. So long as the can is in the holder and sealed its interior is thus in communication with the air pipe 40. The movement of the head, 34, toward and away from the base, 31, is imparted by a pitman, 44, attached to a crank, 45, on the shaft 46. On the other end of this shaft,—see Fig. 8,—is a block, 47, having parallel faces 48, and 49. The shaft also carries on short arms the two rollers 50, 51. On the stationary frame 21 of the machine is a stationary spider 52, which within its circular rim is provided with a lock-cam device, shown at Fig. 8 in plan. This lock-cam consists of the flanges 53, 54, provided with the opposite inclines 55, 56, and intervening recess 57, in conjunction with a grooved face-plate, 58, containing the groove 59, parallel with said flanges, and the oppositely inclined grooves 60, 61.

Turning to Fig. 8, the operation of this mechanism which is as follows will be readily understood; the shaft, 46, carried by the great wheel moves in the direction of the arrow on said figure, causing the block, 47, to ride with its face 48 on the flange 53, the roller 50 being at this time in the groove 59. As the motion of the shaft continues, the roller 50 encountering the inclined groove 60 is momentarily retarded in its forward movement causing the shaft and the block 47 to turn on the incline 56 and said block enters the cavity 57. Further movement causes said roller 50 to traverse the groove 60 and the roller 51 to enter the groove 61. Momentarily the roller 50 will be in the groove 60 and the roller 51 in the groove 61 while the block 47 now turned on end will be in the cavity 57. Further movement swings the roller 50 up into the straight upper groove 62 and the roller 51 into the lower groove 59, when the shaft 46, it will be seen has been turned through an arc of 180° by the crank 45, pitman 44, which amount of movement is exactly sufficient to move the head, 34, from the position indicated in dotted lines to the one indicated in full lines at Fig. 3. The head is held firmly and securely in this position until another lock cam device is reached at that point in the revolution of the great wheel, at which the tested cans are to be discharged. This second lock-cam device swings the crank and shaft through another 180° and thus puts the movable head, 34, back into the open position for the discharge of the tested can and the receiving of another one from the feed chute. It will thus be seen that the receiving of the cans into the can testing machine and their discharge therefrom is done automatically by the movement of the wheel itself, and that the cans are received into the wheel from a single feed chute and discharged from the wheel into a single discharge-chute 63. Above the discharge chute 63, is the divergent chute 64, into which the leaky cans are diverted. This diversion is effected by the trap door, 65, mounted on the shaft, 66, an arm 67, of which, is connected by a rod 68 to an arm, 69, carrying the trip arm 70. This trip arm, 70, stands in the path of certain movable projections, on the great wheel, one for each can. One of these movable projections is seen at 71 in Figs. 3 and 5. The projection is conveniently applied to the slide bar, 35, by piercing said slide bar with a longitudinal central hole so that the projection 71, consisting of a cylindric rod, may pass entirely through said bar and project at one end or the other according as it is positioned. When in the position indicated in full lines at Fig. 3, this projection will not encounter the trip 70; but when in the position indicated in dotted lines at said Fig. 3 it will strike and operate said trip causing the trap door in the discharge chute to be closed and the can in that particular holder to be diverted from the common chute or runway and so cast among the leaky ones. When the projection, 71, shall have been pushed out to encounter the trip, and has done its work it is returned again to normal position automatically by the movement of the great wheel, which causes the projection to encounter the stationary cam surface 72,—see Fig. 2,—sliding the rod or projection back into normal position.

Figs. 5, 6 and 7 show the mechanism by means of which this projection, 71, is, upon a desired occasion, moved out to encounter the trip. This mechanism consists of an electromagnet, 73, to the armature, 74, of which, is connected a pivoted wiper, 75. When the magnet is energized this wiper is momentarily set out into the path of the projection and being encountered moves the latter into the required position to operate the trap door. The energizing of the electromagnet is by a battery or other source of electrical energy, as shown in the drawings. One terminal of the circuit is shown at 76, and the current therein is controlled by a switch, 77, pivoted at, 78, in the air chamber 79. A flexible diaphragm 80 is in this air chamber and said diaphragm is connected by a rod, 81, to the switch bar 77. Compressed air from a tank or other source of supply not shown, is admitted to the interior of the chamber, 79, through the pipe 82, acting on the diaphragm 80 and thereby tending to produce electrical connection at the end of switch bar 77 and terminal 76. Air is admitted to the other side of the diaphragm through two pipes, 83, 84, as will be hereinafter described, with a tendency to depress the diaphragm and bring the switch out of contact with the active terminal 76, the tendency of the opposing forces on opposite sides of the diaphragm being to balance same, and normally hold the switch bar 77 out of contact with the terminal 76. A glass window 85 enables the operator to examine the interior of the chamber and inspect the condition of the switch at any time.

The means employed for conveying the compressed air from the tank to the cans and from the cans to the switch operating diaphragm, consists of a stationary valve plate or disk, 87, shown separately at Fig. 9, and mounted on the framework of the machine. Tapped in its periphery is the pipe 88 which leads from the compressed air tank, and communicates with two openings 89, 90, in the working face of said plate. And in another place said disk is tapped with the pipes, 83, and, 84, having respectively the openings 91 and 92 in the working face. Countering or opposing this stationary disk 87, and mounted to rotate with the great wheel, so that the faces of the two disks shall rub together with an air tight joint, is a movable valve disk, 93, tapped at its periphery with the pipes, 40,—before mentioned,—connected one to each of the can holders and communicating with the interior of the cans as hereinbefore described. For each of the pipes, 40, and communicating therewith is an opening, 93$^a$, leading out to the working face of the disk, 93, and in position, when properly turned, momentarily to match the opening, 89, in the other disk leading to the tank, and to match momentarily in turn the opening, 91, in said other disk leading to the outer side of the switch operating diaphragm. Said movable plate 93 is also provided with an inner, annular, channel shown in dotted lines at 94, having openings 95 from said channel to the working face of the disk, in number equaling the number of the cans to be operated upon and in position momentarily to match in turn the opening, 90, on the other disk that leads to the tank, and upon a further turning of the disk to match momentarily the opening, 92, leading through the pipe, 84, to the other side of the switch operating diaphragm.

The operation is as follows:—As the great wheel turns, carrying with it the cans and the pierced valve disk 93, each can in turn receives momentarily from the tank, through the pipe, 88, and one of the pipes, 40, a charge of compressed air. If the can be sound and without leak nothing further happens until the wheel carries this can around to the discharge chute, where being released by the opening of the clamp it falls out and rolls down among the sound cans. If the can be leaky in the slightest degree, however, the pressure within the can, owing to the presence of the displacing block or bulk and the consequent small amount of air, rapidly falls. But, until the great wheel has moved far enough around to bring the opening, 93$^a$, of this particular can into registry with the opening 91, in the stationary disk, leading through pipe 83 to the outer side of the diaphragm, no effect upon the diaphragm is produced by this fall in pressure due to the leak. As soon as this matching takes place, however, the pressure on the diaphragm becomes immediately unbalanced, the tank pressure on its one side exceeding the can pressure on its other side, and consequently the switch is at once lifted by the diaphragm into contact with the terminal 76, thereby closing the circuit and energizing the electromagnet, and the said magnet instantly thrusts the wiper 75 into the path of the projection 71 belonging to that can to set said projection into position to operate the leaky can trap. And said leaky can, after it rolls into the discharge chute, is diverted by said trap from the path taken by the sound ones. It will be necessary, as will be readily understood, to now quickly reset or bring the diaphragm apparatus again into a condition of balance in order to deënergize the magnet and thus withdraw the wiper 75 before it shall wrongfully set the trap for a succeeding and possibly good can. This rebalance is effected by the pipe, 84, whose aperture, 92, on the face of the stationary disk, 87, comes, in due course to match momentarily one of the holes, 95, of the channel, 94, in the moving counter plate, which channel is in communication, by virtue of the hole, 95, in its plate, the hole, 90, in the staionary plate, and the pipe 88, with the compressed air tank, so that immediately the pressure of the tank is thus again brought to bear upon both sides of the diaphragm and the switch 77 restored to an open condition ready for the next leaky can to throw the balance out and again move the switch.

As clearly shown in Fig. 6, the volume of that part of the chamber above the diaphragm 80 and which is in communication successively with the interiors of the cans, is a great deal less than that portion of the chamber below said diaphragm. This serves to still further increase the sensitiveness of the apparatus, since it will be apparent that a small amount of leakage from a can will constitute a relatively large proportion of the volume of air on the upper side of the diaphragm 80, thereby causing a quicker and greater unbalancing of the pressures on the diaphragm when a leaky can is put in communication with the diaphragm chamber.

We claim—

1. The combination in an air passage can tester with means for sealing the can and for admitting compressed air thereto, of a displacement body to be inserted in the sealed can for diminishing the volume of compressed air in the can and means for indicating any lessening of the air pressure in the sealed can, such indicating means including a chamber containing a flexible diaphragm having an air communication at one side to the compressed air supply and at the other side to the interior of the can being tested and an electric circuit having included therein a switch and an electromagnet, the switch being operated by movements of the diaphragm, substantially as specified.

2. The combination in an air passage can tester with means for sealing the can and for admitting compressed air thereto, of a displacement body to be inserted in the sealed can for diminishing the volume of compressed air in the can and means for indicating any lessening of the air pressure in the sealed can, such indicating means including a chamber containing a flexible diaphragm having an air communication at one side to the compressed air supply and at the other side to the interior of the can being tested, an electric circuit having included therein a switch and an electromagnet, the switch being operated by the movements of the diaphragm, and a device moved by the magnet to determine the path of the can when discharged, substantially as specified.

3. The can tester comprising in combination a rotating great wheel or carrier provided with a multiplicity of can holders, each having a cradle shaped and arranged to engage and support the convex side of the can, the cradles being bodily movable with the carrier and movable relative to the carrier, a base to receive and seal the open mouth of the can, means carried by said base for diminishing the volume of the interior of the can, a movable head for pushing the can against the base, an air duct to supply the sealed can with compressed air and means for connecting said air duct automatically and momentarily with the supply source or tank, substantially as specified.

4. The can tester comprising in combination a rotating great wheel or carrier provided with a multiplicity of can holders each having a cradle for supporting the can, a base to receive and seal the open mouth of the can, and a displacement body on each base to enter the can and diminish the volume of compressed air, substantially as specified.

5. The can tester comprising in combination a rotating great wheel or carrier provided with a multiplicity of can holders each having a cradle for supporting the can, a base to receive and seal the open mouth of the can, a movable head for pushing the can against the base, an air duct to supply the sealed can with compressed air and means for connecting said air duct automatically and momentarily with the supply source or tank and subsequently with a chamber containing a diaphragm opposed by compressed air from the supply source, substantially as specified.

6. The can tester comprising in combination a rotating great wheel or carrier provided with a multiplicity of can holders each having a cradle for supporting the can, a base to receive and seal the open mouth of the can, a displacement body on said base to enter the cam and diminish the volume of compressed air, an air duct to supply the sealed can with compressed air and means for connecting said air duct automatically and momentarily with a supply source or tank and subsequently with a chamber containing a diaphragm opposed bv compressed air from the supply source, substantially as specified.

7. The can tester comprising in combination a rotating great wheel or carrier provided with a multiplicity of can holders each having a cradle for supporting the can, a base to receive and seal the open mouth of the can, a movable head for pushing the can against the base, an air duct to supply the sealed can with compressed air and means for connecting said air duct automatically and momentarily with the supply source or tank, and subsequently with a chamber containing a diaphragm opposed by compressed air from the supply source, an electric switch operated by the movement of said diaphragm and controlling an electromagnet to move a device for the purpose of diverting a leaky can from the path of sound ones, substantially as specified.

8. In a can tester, in combination: a carrier, a can holder thereon including a base and a movable coöperating clamping member, a chute for feeding can bodies to the holder on the carrier, a duct for supplying compressed air to a clamped can, connections from said duct to a source of supply of compressed air, a stationary chamber having a diaphragm therein and electrical devices for operating a trip adapted to separate the leaky from the sound cans carried by the carrier, said devices including a switch opened and closed by the movements of the diaphragm.

9. The can tester comprising in combination a rotating great wheel or carrier provided with a multiplicity of can holders each having a cradle for supporting the can, a base to receive and seal the open mouth of the can, a movable head for pushing the can against the base, an air duct to supply the sealed can with compressed air, means for connecting said air duct automatically and momentarily with the supply source or tank, said means consisting of a rotary pierced plate connected to the base of the holder, and a stationary pierced plate rubbing therewith mounted on the frame of the machine and connected with the compressed air tank, and means including an electrically controlled trip for automatically separating leaky cans from sound cans, substantially as specified.

10. The can tester comprising in combination a rotating great wheel or carrier provided with a multiplicity of can holders each having a cradle for supporting the can, a base to receive and seal the open mouth of the can, a movable head for pushing the can against the base, an air duct to supply the sealed can with compressed air and means for connecting said air duct automatically and momentarily with the supply source or tank, said means consisting of a rotary pierced plate connected to the base of the holder, and a stationary pierced plate rubbing therewith mounted on the frame of the machine and connected with the compressed air tank, a chamber containing a diaphragm and means for temporarily thereafter connecting the interior of the can with one side of a diaphragm chamber the other side of which is in communication with the air supply consisting of the same two pierced rubbing plates, substantially as specified.

11. The can tester comprising in combination a rotating great wheel or carrier provided with a multiplicity of can holders each having a cradle for supporting the can, a base to receive and seal the open mouth of the can, a movable head for pushing the can against the base, an air duct to supply the sealed can with compressed air and means for connecting said air duct automatically and momentarily with the supply source or tank, said means consisting of a rotary pierced plate connected to the base of the holder, and a stationary pierced plate rubbing therewith mounted on the frame of the machine and connected with the compressed air tank, a chamber containing a diaphragm and means for temporarily thereafter connecting the interior of the can with one side of a diaphragm chamber the other side of which is in communication with the air supply consisting of the same two pierced rubbing plates, which also have means serving to subsequently connect both sides of the diaphragm chamber with the compressed air supply to restore the balance on the diaphragm after it may have been destroyed by a leaky can, substantially as specified.

12. The combination with a moving can carrier, of can holders and means for closing, maintaining closed, opening and maintaining open, said holders, consisting of a crank for each holder connected by a pitman to the movable head of the holder and having on its shaft a two faced block and two roller studs carried on the moving carrier, and a lock cam on the stationary frame of the machine and comprising a bench for the block to ride on with one of its surfaces, a cavity for the block to turn in, a bench for the block to ride on with its other surface, and inverting grooves for inverting the block and thus turning the shaft through a half revolution, substantially as specified.

13. The combination of a moving can carrier provided with a multiplicity of can holders each having a cradle for supporting the can, a base to receive and seal the open mouth of the can, a movable head for pushing the can against the base, a displacement body to partly fill the can, an air supply for charging the can with compressed air and means for pushing the can in its cradle over the displacing body and against the sealing base and withdrawing it therefrom consisting of a crank and pitman operated by the movement of the can carrier, substantially as specified.

14. The mechanical movement suitable for the operation of the can holders which are required to move the can against a sealing base and over a displacement body and withdraw it therefrom and to be actuated from the can carrier in a brief movement of the latter, and which mechanical movement consists in the combination of the following moving parts, a crank and pitman, a two faced sliding block on the crank shaft, two studs on the crank shaft with the following stationary parts, a cam bench for one face of the block to slide upon, a cam bench for the other face of the block to slide upon after it has turned over, a cavity between the benches for the block to turn in, and two opposing cams engaging first one and then the other stud to turn the block and the attached crank shaft and operate the crank and pitman, substantially as specified.

15. The can tester comprising in combination, a carrier provided with a multiplicity of can holders each having a cradle for supporting the can, a base to receive and seal the open mouth of the can, a movable head for pushing the can against the base, an air duct to supply the sealed can with compressed air and means for connecting said air duct automatically and momentarily with the supply source tank and subsequently with a balancing device wherein the air from the can and the air from the supply source are balanced against each other, substantially as specified.

16. The can tester comprising in combination, a carrier provided with a multiplicity of can holders each having a cradle for supporting the can, a base to receive and seal the open mouth of the can, a movable head for pushing the can against the base, an air duct to supply the sealed can with compressed air and means for connecting said air duct automatically and momentarily with the supply source tank and subsequently with a balancing device wherein the air from the can and the air from the supply source are balanced against each other, and a device for diverting the leaky can from the path of the sound ones, controlled and operated by said balancing device, substantially as specified.

17. A can tester of the character described including, in combination: a carrier having a plurality of can holding and clamping means thereon; means for automatically releasing all of the tested cans at a predetermined point; an electric circuit having a switch for opening and closing the same; an air pressure device for operating the said switch; a source of compressed air; and a valve for placing the interior of cans clamped on said carrier, successively, first in communication with the source of compressed air and subsequently with the said air pressure device; the said electric circuit having an electromagnet and means operated thereby to cause the leaky cans to be diverted after they are released.

18. A can tester of the character described including, in combination: a carrier having a plurality of can holding and clamping means thereon; an electric circuit having a switch for opening and closing the same; an air pressure device for operating the said electric switch; a source of compressed air; and air conducting means and a valve for placing the interior of cans clamped on said carrier, successively, first in communication with the source of compressed air, and subsequently with said air pressure device; said valve comprising a non-rotatable disk and a rotatable disk moving with said carrier, each of said disks having ports periodically brought into registry with each other.

19. A can tester of the character described including, in combination: a carrier having a plurality of can holding and clamping means thereon; an air pressure indicating device; a valve for placing the interiors of cans clamped on said carrier, successively, first in communication with a source of compressed air and subsequently with said air pressure indicating device; an electric circuit having included therein a magnet and a switch, the latter being operated by the air pressure device; and a trip operated by said magnet, substantially as specified.

20. In an air pressure can testing machine, an air pressure indicating device including a chamber having a sensitive and movable diaphragm therein arranged close to one of the ends of the chamber and dividing said chamber into two compartments of unequal volume, and closed to the atmosphere the compartment of smaller volume being adapted to be placed in communication with the interiors of sealed cans and the compartment of greater volume being in communication with a source of compressed air, whereby the device is rendered sensitive to any decrease in the volume of air in the smaller compartment and an electric contact element arranged in the compartment and connected with the diaphragm, substantially as specified.

21. A can testing machine including, in combination: a carrier having a plurality of can sealing and clamping devices thereon; displacement bodies carried by said carrier, one for each of said sealing and clamping devices, and adapted to occupy positions within the cans when the latter are clamped and sealed; an air pressure indicating device having a chamber provided with a flexible diaphragm therein, the diaphragm being so located that it divides the chamber into two compartments of unequal volume; a trip device governed by movements of said diaphragm; and a valve for placing the interiors of clamped and sealed cans on said carrier, successively, first in communication with a source of compressed air and then in communication with the smaller compartment of said chamber, substantially as specified.

22. In an air pressure can testing machine, a device operating by air pressure to select the leaky cans, the said device including a chamber having a sensitive and movable diaphragm therein arranged close to one of the ends of the chamber and dividing said chamber into two compartments of unequal volume, air conducting means leading from the smaller chamber to the seat or base for the open end of the can, a source of compressed air communicating with the compartment of greater volume, both of said compartments being closed to the atmosphere, and means which are caused to be operated by the movement of the diaphragm for selecting the destination of the leaky cans.

EDWIN V. SWANGREN.
MAGNUS E. WIDELL.

Witnesses:
PEARL ABRAMS,
ESTHER ABRAMS.